US011003785B2

(12) United States Patent
Liu et al.

(10) Patent No.: US 11,003,785 B2
(45) Date of Patent: *May 11, 2021

(54) DATA TRANSMISSION METHOD AND APPARATUS IN TEE SYSTEMS

(71) Applicant: Advanced New Technologies Co., Ltd., George Town (KY)

(72) Inventors: Qi Liu, Hangzhou (CN); Boran Zhao, Hangzhou (CN); Ying Yan, Hangzhou (CN); Changzheng Wei, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/775,945

(22) Filed: Jan. 29, 2020

(65) Prior Publication Data

US 2020/0167489 A1    May 28, 2020

Related U.S. Application Data

(63) Continuation of application No. PCT/CN2020/071270, filed on Jan. 10, 2020.

(30) Foreign Application Priority Data

Jul. 16, 2019 (CN) .......................... 201910640641.6

(51) Int. Cl.
*G06F 21/00* (2013.01)
*G06F 21/60* (2013.01)
*G06F 12/06* (2006.01)

(52) U.S. Cl.
CPC ........ *G06F 21/606* (2013.01); *G06F 12/0646* (2013.01); *G06F 2212/1052* (2013.01); *G06F 2221/2149* (2013.01)

(58) Field of Classification Search
CPC .......... G06F 21/57; G06F 21/53; G06F 21/44; G06F 21/74; G06F 21/606
See application file for complete search history.

(56) References Cited

U.S. PATENT DOCUMENTS

2018/0288095 A1    10/2018  Shaw et al.
2020/0004953 A1*   1/2020   Lemay .................. G06F 12/023

FOREIGN PATENT DOCUMENTS

CN    103150220    6/2013
CN    103645863    3/2014
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Ghazal B Shehni
(74) *Attorney, Agent, or Firm* — Fish & Richardson P.C.

(57) ABSTRACT

Examples of a data transmission method and apparatus in TEE systems are described. One example of the method includes: obtaining first data; obtaining a write offset address by reading a first address; obtaining a read offset address by reading a second address; determining whether the number of bytes in the first data is less than or equal to the number of writable bytes, where the number of writable bytes is determined based on the write offset address and the read offset address, and each address corresponds to one byte; when the number of bytes in the first data is less than or equal to the number of writable bytes, writing the first data into third addresses starting from the write offset address; and updating the write offset address in the first address.

21 Claims, 12 Drawing Sheets

(56) References Cited

FOREIGN PATENT DOCUMENTS

| CN | 103856485 | 6/2014 |
|---|---|---|
| CN | 104392188 | 3/2015 |
| CN | 104408371 | 3/2015 |
| CN | 104620253 | 5/2015 |
| CN | 105183665 | 12/2015 |
| CN | 105791284 | 7/2016 |
| CN | 106354687 | 1/2017 |
| CN | 107533609 | 1/2018 |
| CN | 108549571 | 9/2018 |
| CN | 108733455 | 11/2018 |
| CN | 109347629 | 2/2019 |
| CN | 109558211 | 4/2019 |
| CN | 109783207 | 5/2019 |
| CN | 109871717 | 6/2019 |
| CN | 110399235 | 11/2019 |
| CN | 110427274 | 11/2019 |
| CN | 110442462 | 11/2019 |
| CN | 110442463 | 11/2019 |
| EP | 3379448 | 9/2018 |
| WO | WO 2019089403 | 5/2019 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2020/071270, dated Apr. 28, 2020, 13 pages (with partial machine translation).

* cited by examiner

DATA TRANSMISSION METHOD AND APPARATUS IN TEE SYSTEMS

CROSS-REFERENCE TO RELATED APPLICATIONS

This application is a continuation of PCT Application No. PCT/CN2020/071270, filed on Jan. 10, 2020, which claims priority to Chinese Patent Application No. 201910640641.6, filed on Jul. 16, 2019. Each of the foregoing applications is incorporated herein by reference in its entirety.

TECHNICAL FIELD

Embodiments of the present disclosure relate to the field of trusted execution environment (TEE) technologies, and more specifically, to a data transmission method and apparatus in TEE systems.

BACKGROUND

A trusted execution environment (TEE) is a secure and trusted area in a processor, and can ensure security, confidentiality, and integrity of code and data that are placed therein. The TEE provides an isolated execution environment. The code and data can run in this trusted area. During running, calculation of the code and data can be ensured without interference from a normal operating system. As such, confidentiality and integrity of the code and data can be ensured. TEE(EAL2+) provides higher-level security than a conventional operating system, and provides more functions and better performance than SE(EAL5). The TEE has many implementation methods, such as SGX of Intel, SEV of AMD, and TrustZone of ARM. Because the TEE provides an isolated execution environment, communication between a non-TEE environment and a TEE environment is generally invoked by using a special instruction, such as smc call (TrustZone) or ecall ocall (SGX).

SUMMARY

Embodiments of the present disclosure are intended to provide a more effective solution for data transmission in a TEE system to address deficiencies in the existing technology.

An aspect of the present disclosure provides a data transmission method in a TEE system. The TEE system includes a TEE side and a non-TEE side. The non-TEE side includes a shared memory, and the shared memory includes a first address, a second address, and multiple consecutive third addresses. The first address is used to store a write offset address, the write offset address indicates a writable start address in the multiple third addresses. The second address is used to store a read offset address, the read offset address indicates a readable start address in the multiple third addresses. The third addresses are used to store data from the TEE side. The method is executed by the TEE side and includes: obtaining first data; obtaining a write offset address by reading the first address; obtaining a read offset address by reading the second address; determining whether the number of bytes in the first data is less than or equal to the number of writable bytes, where the number of writable bytes is determined based on the write offset address and the read offset address, and each address corresponds to one byte; when the number of bytes in the first data is less than or equal to the number of writable bytes, writing the first data into third addresses starting from the write offset address; and updating the write offset address in the first address.

In an embodiment, the first data is any one of the following data: log, monitoring data, or statistical data.

In an embodiment, the method further includes: waiting when the number of bytes in the first data is greater than the number of writable bytes.

In an embodiment, the shared memory further includes a fourth address, used to store the quantity of discarded data, and the method further includes: discarding the first data when the number of bytes in the first data is greater than the number of writable bytes, and increasing the quantity of discarded data stored in the fourth address by one.

In an embodiment, the quantity of discarded data is an atomic variable.

In an embodiment, the write offset address is before the read offset address, and the number of writable bytes is equal to a difference between the read offset address and the write offset address.

In an embodiment, the write offset address is after the read offset address, the number of writable bytes is equal to a difference between the number of third addresses and the number of non-writable bytes, and the number of non-writable bytes is equal to a difference between the write offset address and the read offset address.

In an embodiment, the write offset address is the same as the read offset address, and the number of writable bytes is equal to the number of all third addresses.

Another aspect of the present disclosure provides a data transmission method in a TEE system. The TEE system includes a TEE side and a non-TEE side. The non-TEE side includes a shared memory, and the shared memory includes a first address, a second address, and multiple consecutive third addresses. The first address is used to store a write offset address, the write offset address indicates a writable start address in the multiple third addresses. The second address is used to store a read offset address, the read offset address indicates a readable start address in the multiple third addresses. The third addresses are used to store data from the TEE side. The method is executed by the non-TEE side and includes: obtaining a write offset address by reading the first address; obtaining a read offset address by reading the second address; reading unread bytes in written data in the third addresses as second data, where the unread bytes are determined based on the write offset address and the read offset address, and each address corresponds to one byte; and updating the read offset address in the second address.

In an embodiment, the write offset address is after the read offset address, and the unread bytes include bytes starting from the read offset address to a previous address of the write offset address.

In an embodiment, the write offset address is before the read offset address, the unread bytes are bytes other than read bytes in the third addresses, and the read bytes include bytes starting from the write offset address to a previous address of the read offset address.

In an embodiment, when the write offset address is the same as the read offset address, the third addresses do not include the unread bytes.

In an embodiment, the second data is log data, and the method further includes: after the read offset address in the second address is updated, sending the second data to a log printing program on the non-TEE side to print the second data.

Another aspect of the present disclosure provides a data transmission apparatus in a TEE system. The TEE system includes a TEE side and a non-TEE side. The non-TEE side includes a shared memory, and the shared memory includes a first address, a second address, and multiple consecutive third addresses. The first address is used to store a write offset address, the write offset address indicates a writable start address in the multiple third addresses. The second address is used to store a read offset address, the read offset address indicates a readable start address in the multiple third addresses. The third addresses are used to store data from the TEE side. The apparatus is deployed on the TEE side and includes: a first acquisition unit configured to obtain first data; a second acquisition unit configured to obtain a write offset address by reading the first address; a third acquisition unit configured to obtain a read offset address by reading the second address; a determining unit configured to determine whether the number of bytes in the first data is less than or equal to the number of writable bytes, where the number of writable bytes is determined based on the write offset address and the read offset address, and each address corresponds to one byte; a writing unit configured to: when the number of bytes in the first data is less than or equal to the number of writable bytes, write the first data into third addresses starting from the write offset address; and an update unit configured to update the write offset address in the first address.

In an embodiment, the first data is any one of the following data: log, monitoring data, or statistical data.

In an embodiment, the apparatus further includes a waiting unit configured to instruct the apparatus to wait when the number of bytes in the first data is greater than the number of writable bytes.

In an embodiment, the shared memory further includes a fourth address used to store the quantity of discarded data, and the apparatus further includes a discarding unit configured to discard the first data when the number of bytes in the first data is greater than the number of writable bytes, and increase the quantity of discarded data stored in the fourth address by one.

Another aspect of the present disclosure provides a data transmission apparatus in a TEE system. The TEE system includes a TEE side and a non-TEE side. The non-TEE side includes a shared memory, and the shared memory includes a first address, a second address, and multiple consecutive third addresses. The first address is used to store a write offset address, the write offset address indicates a writable start address in the multiple third addresses. The second address is used to store a read offset address, the read offset address indicates a readable start address in the multiple third addresses. The third addresses are used to store data from the TEE side. The apparatus is deployed on the non-TEE side and includes: a first acquisition unit configured to obtain a write offset address by reading the first address; a second acquisition unit configured to obtain a read offset address by reading the second address; a reading unit configured to read unread bytes in written data in the third addresses as second data, where the unread bytes are determined based on the write offset address and the read offset address, and each address corresponds to one byte; and an update unit configured to update the read offset address in the second address.

In an embodiment, the second data is log data, and the apparatus further includes a printing unit configured to: after the read offset address in the second address is updated, send the second data to a log printing program on the non-TEE side to print the second data.

Another aspect of the present disclosure provides a computer readable storage medium that stores a computer program, and when the computer program is executed on a computer, the computer is caused to perform the method according to any one of the previous aspects.

Another aspect of the present disclosure provides a computing device, including a memory and a processor. Executable code is stored in the memory, and when executing the executable code, the processor implements the method according to any one of the previous aspects.

The data transmission solution in the TEE system in the embodiments of the present disclosure provides a high-performance asynchronous data transmission system for the TEE environment, for example, an asynchronous log printing system, which reduces overheads of printing logs in the TEE system, improves a running speed of the TEE system, and meets some basic requirements for the log system.

BRIEF DESCRIPTION OF DRAWINGS

By describing the embodiments of the present disclosure with reference to the accompanying drawings, the embodiments of the present disclosure can be made clearer.

DESCRIPTION OF EMBODIMENTS

The following describes the embodiments of the present disclosure with reference to the accompanying drawings.

Figure 1:
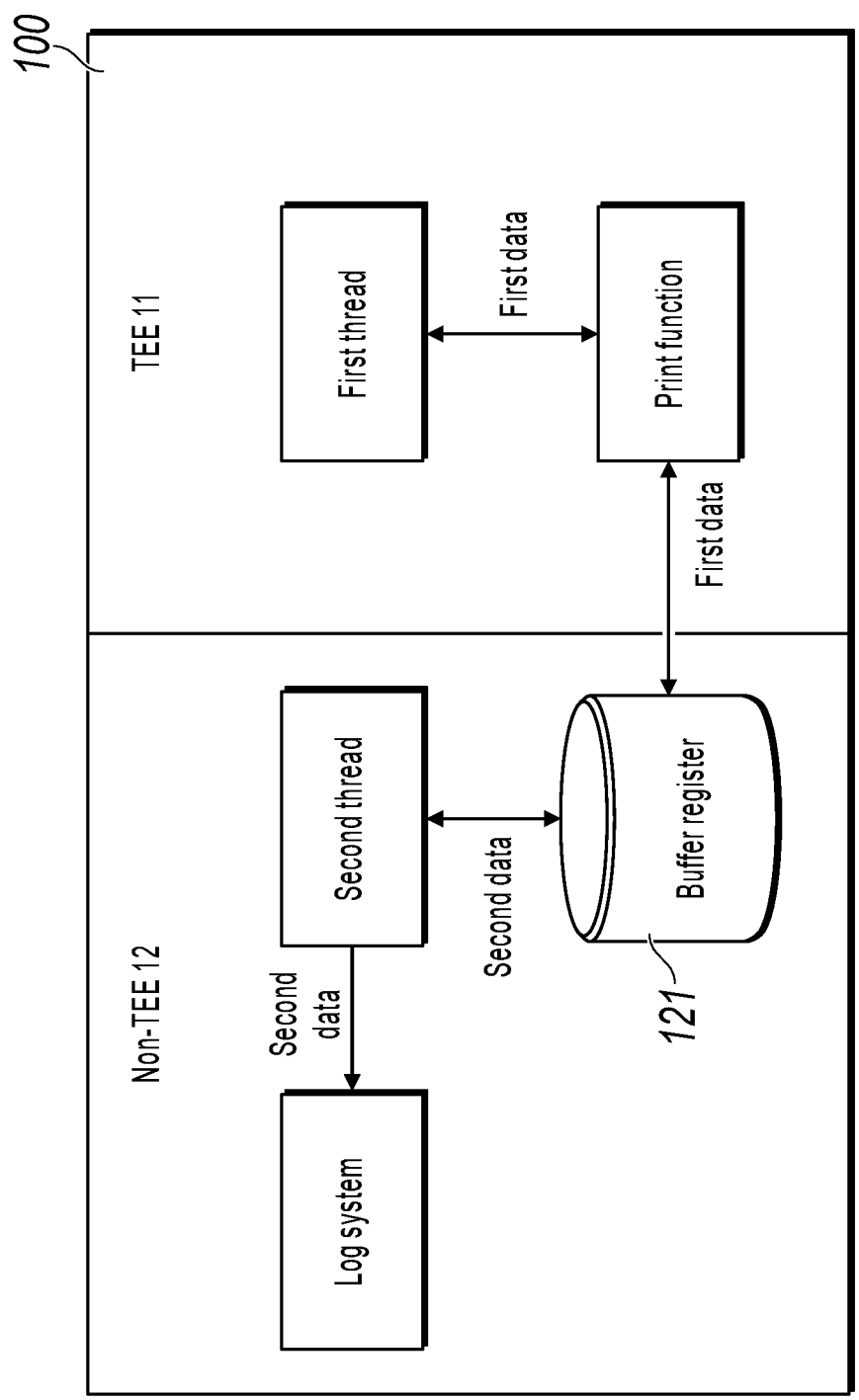
FIG. 1 is a schematic diagram illustrating a TEE system and a data flow direction in the system, according to an embodiment of the present disclosure.

FIG. 1 is a schematic diagram illustrating a TEE system 100 and a data flow direction in the system, according to an embodiment of the present disclosure. As shown in the figure, the system 100 includes a TEE side 11 and a non-TEE side 12. A dedicated buffer register 121 is predetermined on the non-TEE side 12 as a shared memory, and is configured to cache data (for example, a log) transmitted from the TEE side. A first thread is running on the TEE side 11, and the first thread can obtain first data (e.g., log data) and stores the first data in the buffer register 121 by invoking, for example, a print function (Bl_pringf). In one example, the Bl_pringf function can write the log to the buffer register 121 by invoking a push function. A second thread runs on the non-TEE side 12. For example, the second thread reads stored data from the buffer register 121 by periodically invoking a pop function in a polling method, for example, by reading second data in one read. After reading the second data, the second thread sends the second data to a program (for example, a log system log4cplus) on the non-TEE side for data printing.

In the previous schematic diagram, to ensure data security when the first thread and the second thread access the shared memory at the same time, a data structure is designed to allow the previous process to be performed, which is described in detail in the following.

Figure 2:
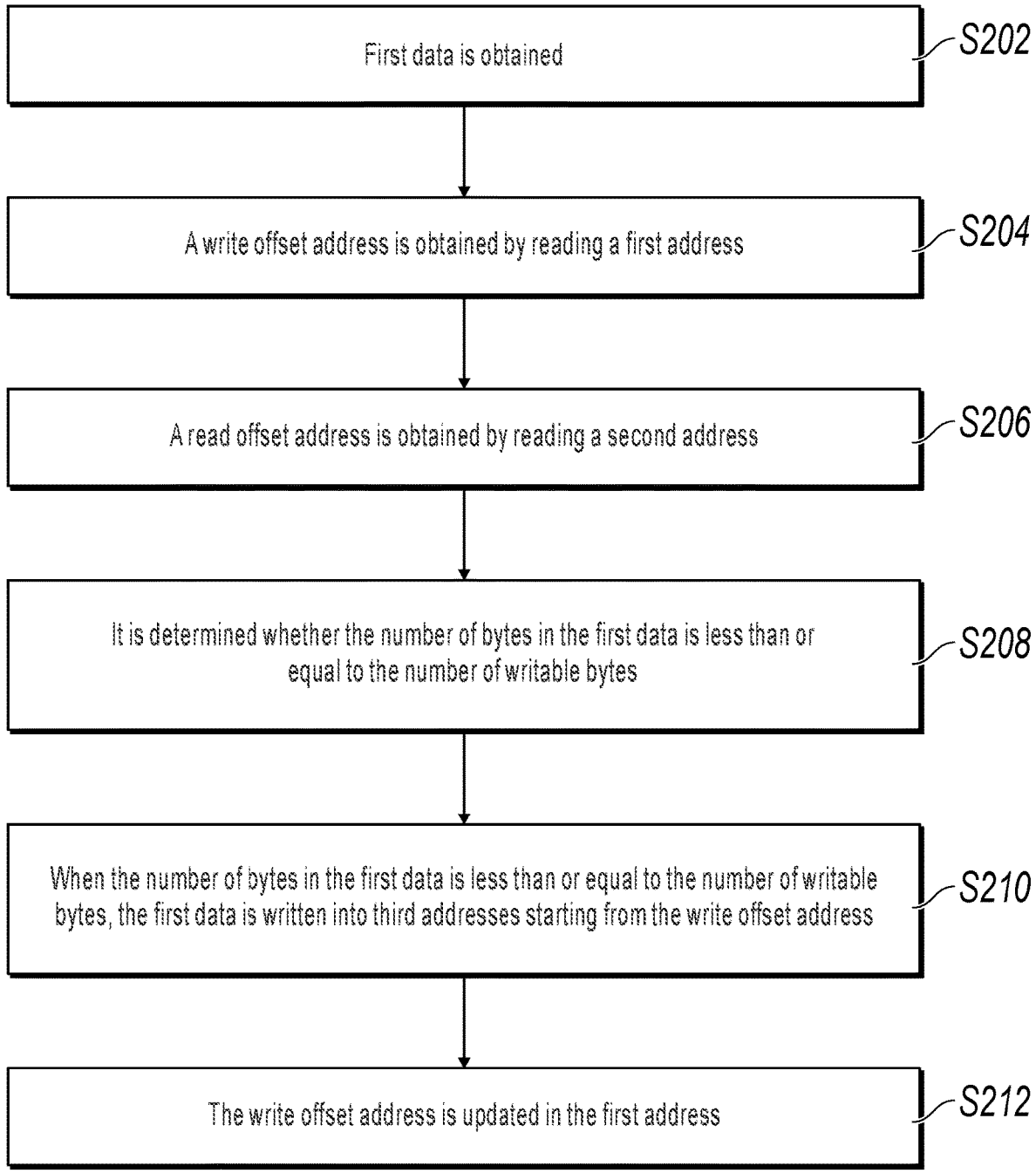
FIG. 2 is a flowchart illustrating a data transmission method in a TEE system, according to an embodiment of the present disclosure.

FIG. 2 is a flowchart illustrating a data transmission method in a TEE system, according to an embodiment of the present disclosure. The TEE system includes a TEE side and a non-TEE side. The non-TEE side includes a shared memory, and the shared memory includes a first address, a second address, and multiple consecutive third addresses. The first address is used to store a write offset address, the write offset address indicates a writable start address in the multiple third addresses. The second address is used to store a read offset address, the read offset address indicates a readable start address in the multiple third addresses. The third addresses are used to store data from the TEE side. The method is executed by the TEE side and includes following steps.

At step S202, first data is obtained.

At step S204, a write offset address is obtained by reading the first address.

At step S206, a read offset address is obtained by reading the second address.

At step S208, it is determined whether the number of bytes in the first data is less than or equal to the number of writable bytes. The number of writable bytes can be determined based on the write offset address and the read offset address, and each address corresponds to one byte.

At step S210, when the number of bytes in the first data is less than or equal to the number of writable bytes, the first data is written into third addresses starting from the write offset address.

At step S212, the write offset address is updated in the first address.

Figure 3:
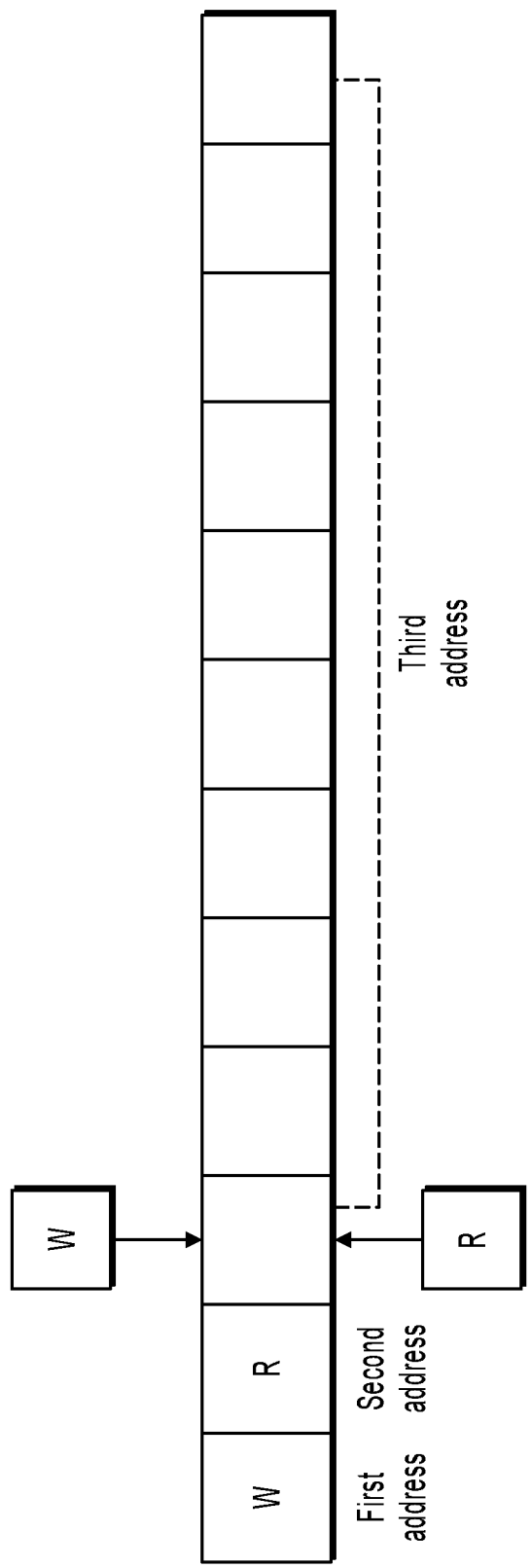
FIG. 3 is a schematic diagram illustrating a data structure in a shared memory, according to an embodiment of the present disclosure.

FIG. 3 is a schematic diagram illustrating a data structure in a shared memory, according to an embodiment of the present disclosure. As shown in FIG. 3, the shared memory includes a first address, a second address, and multiple consecutive third addresses. The figure shows 10 third addresses. For example, the 10 consecutive third addresses can be respectively identified as "1, 2, . . . , 10". One byte can be written to each address in the memory. The first address is used to store a write offset address, and the write offset address indicates a writable start address in the third addresses. The second address is used to store a read offset address, and the read offset address indicates a readable start address in the third addresses. The third addresses are used to store data that is expected to be transmitted from the TEE side to the non-TEE side. For example, initially, when data is not stored in the shared memory from the TEE side, a writable start address in the third addresses is the 1st address, that is, address "1". Therefore, the write offset address stored in the first address is "1". In this case, when data is read, because only a previous address of the write offset address can be read at most, the read offset address in the second address is also address "1". The figure shows third addresses (that is, address "1") respectively corresponding to the read offset address (represented by R in the figure) and the write offset address (represented by W in the figure). It can be understood that in the shared memory, the multiple third addresses are limited to be consecutive addresses, and a location relationship among the first address, the second address, and the third addresses is not specifically limited. For example, the first address and the second address can be respectively located on two ends of the third addresses, or the first address and the second address can be located after the third addresses. In addition, FIG. 3 shows that the shared memory includes 10 consecutive third addresses. However, in some embodiments, the number of third addresses included in the shared memory can be determined based on a number of bytes in to-be-transmitted data. For example, the to-be-transmitted data can be a log on the TEE side. For example, the log usually has dozens of bytes, so the shared memory can be set to include hundreds of consecutive third addresses.

When the TEE side wants to transmit data to the non-TEE side, the method is performed by running the first thread on the TEE side to write data into the third addresses of the shared memory. The first thread belongs to, for example, a process of transmitting data from the TEE side to the non-TEE side. After the data is written into the shared memory by using the method, the data is to be transmitted to a target program by using another thread on the non-TEE side. Therefore, the data is transmitted asynchronously in the method. As such, the method is applicable to data that has a relatively low requirement for real-time performance, a relatively large transmission amount, and a relatively high requirement for performance. Thus, the data is, for example, a log, monitoring data, and statistical data.

First, in step S202, the first data is obtained.

The first data is, for example, a log generated in the TEE. After generating the log, the TEE side stores the log at a predetermined memory location on the TEE side. The first thread can be predetermined to periodically read a log from the predetermined memory location, so to-be-transmitted data can be periodically obtained, so as to periodically perform the method.

In step S204, the write offset address is obtained by reading the first address. In step S206, the read offset address is obtained by reading the second address.

In addition to the case where both the write offset address and the read offset address shown in FIG. 3 indicate address "1" in the third addresses, FIG. 4 to FIG. 8 respectively show the write offset address and the read offset address in the data transmission process by using the shared memory. In FIG. 4 to FIG. 8, each block corresponds to one address, data inside the block is one byte of data, a number below the block is an address identifier of the block, and "R" and "W" are respectively corresponding to the read offset address and the write offset address as indicated above.

Figure 4:
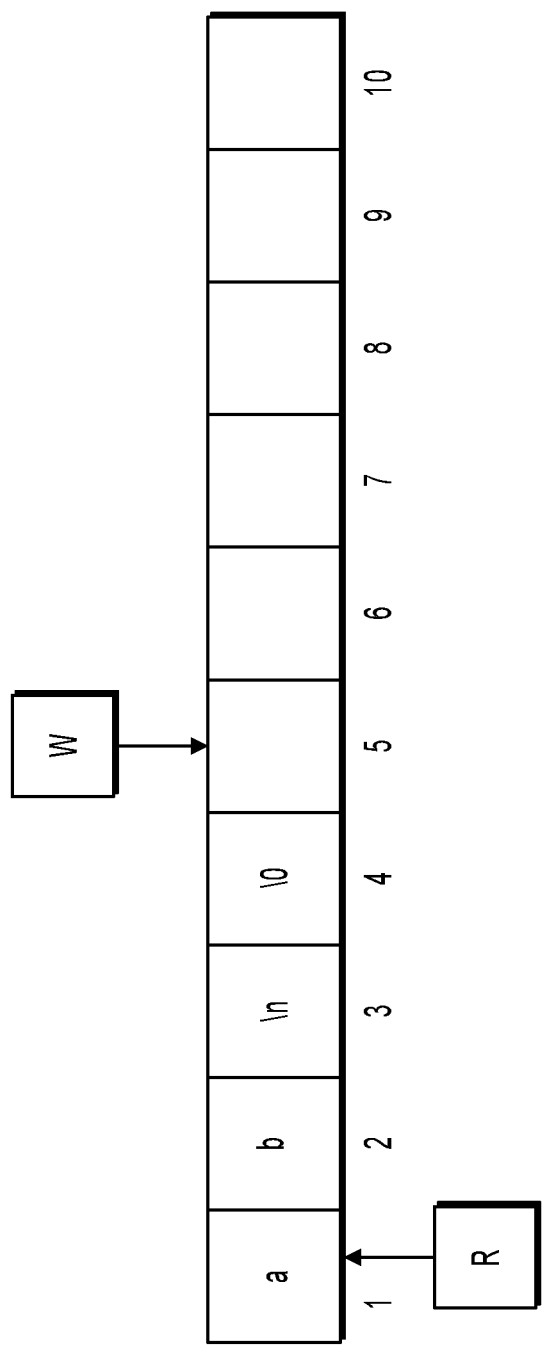
FIG. 4 to FIG. 8 illustrate a write offset address and a read offset address during data transmission by using the shared memory.

In FIG. 4, four bytes "ab\n\0" have been sequentially written into the third addresses starting from address 1 by using the method as described herein, and the shared memory has not been read on the non-TEE side. In this case, a write offset address (W) stored in the first address points to an address after the storage "\0", that is, address 5, and a read offset address (R) stored in the second address still points to address 1.

Figure 5:
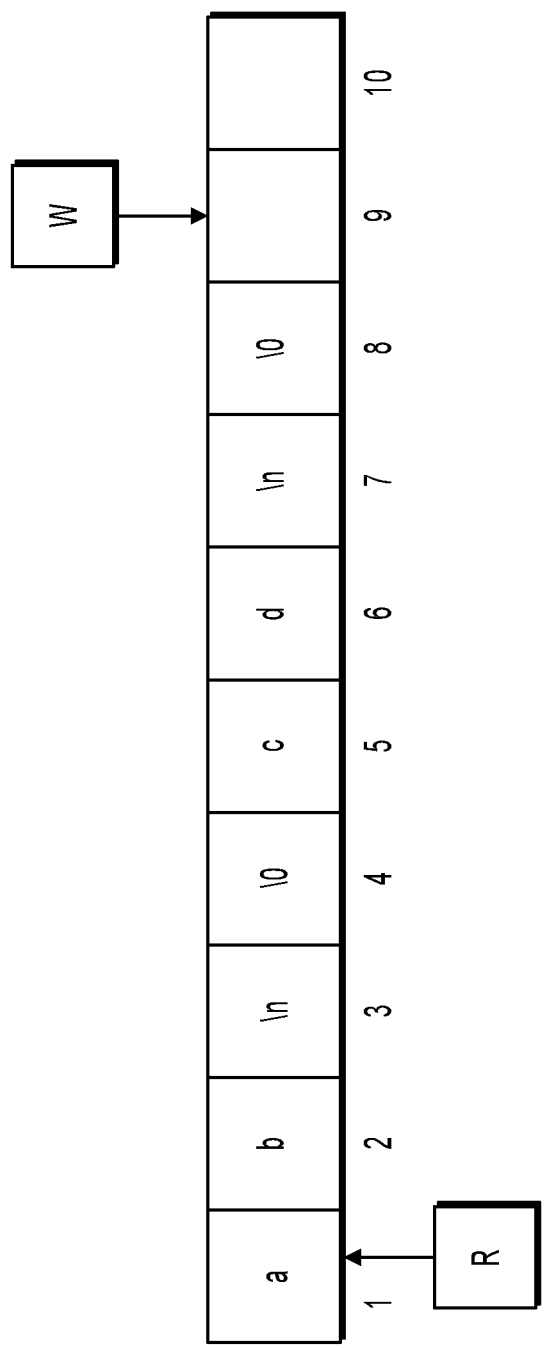

In FIG. 5, four bytes "cd\n\0" have been sequentially written starting from address 5 by using the method as described herein, and the shared memory is still not read on the non-TEE side. In this case, the write offset address (W) points to the address after the address where the second "\0" is stored, that is, address 9, and the read offset address (R) still points to address 1.

Figure 6:
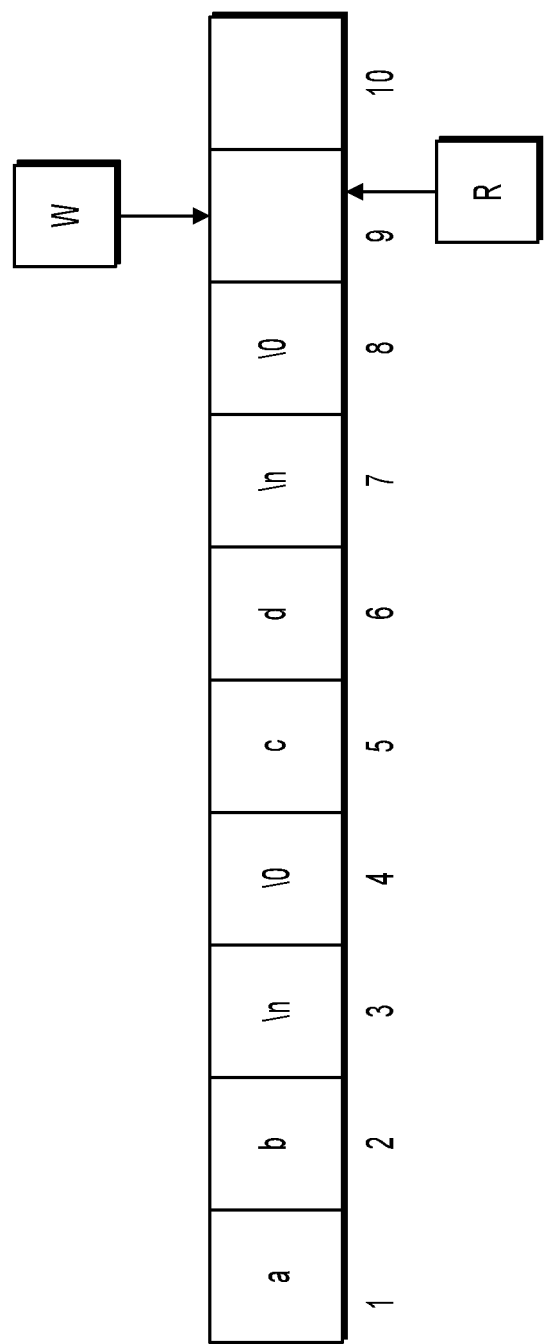

In FIG. 6, data reading has been performed on the non-TEE side starting from a read offset address by using the method described below. One address before the write offset address can be read at most, that is, the read process reads eight bytes "ab\n\0cd\n\0" that have been written in the shared memory. In this case, the write offset address stored in the first address still points to address 9, and the read offset address stored in the second address points to the address after the second "\0", that is, also address 9.

Figure 7:
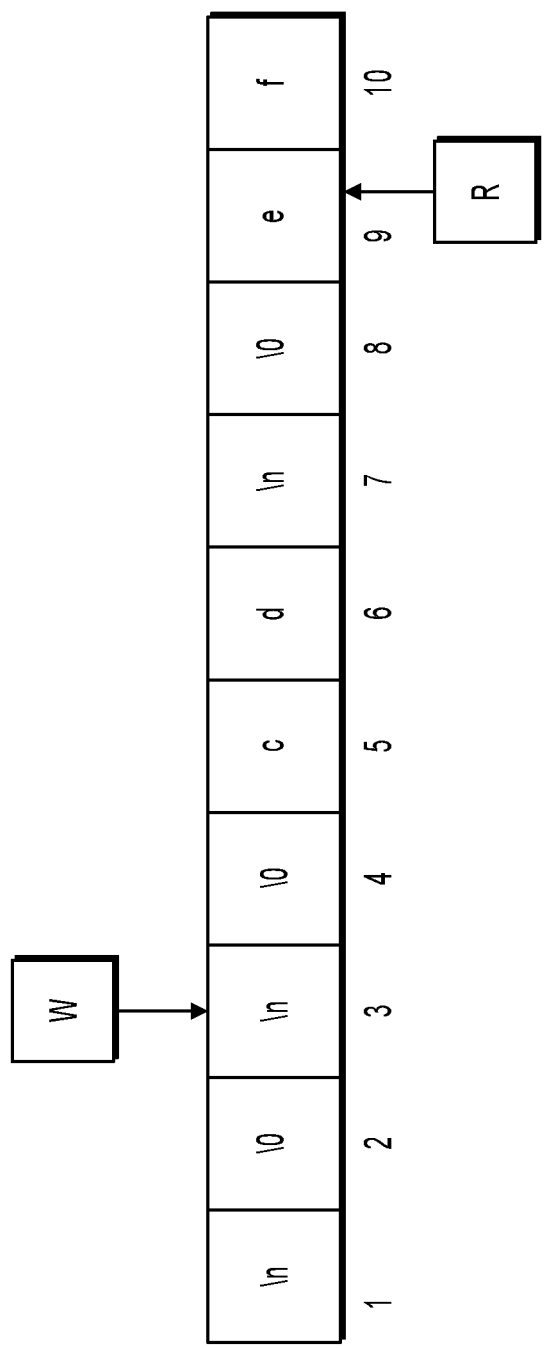

In FIG. 7, four bytes "ef\n\0" have been sequentially written to the third addresses starting from address 9 by using the method shown in FIG. 2. In this case, the read offset address does not change and is still address 9. In a process of writing data, after all 10 addresses are fully written, because all data before the read offset address is read, all addresses starting from address 1 to the address (that is, address 8) before the read offset address (in this case, address 9) can be written. Therefore, writing continues jumping from address 10 to address 1. After writing is completed, the write offset address points to address 3.

Figure 8:
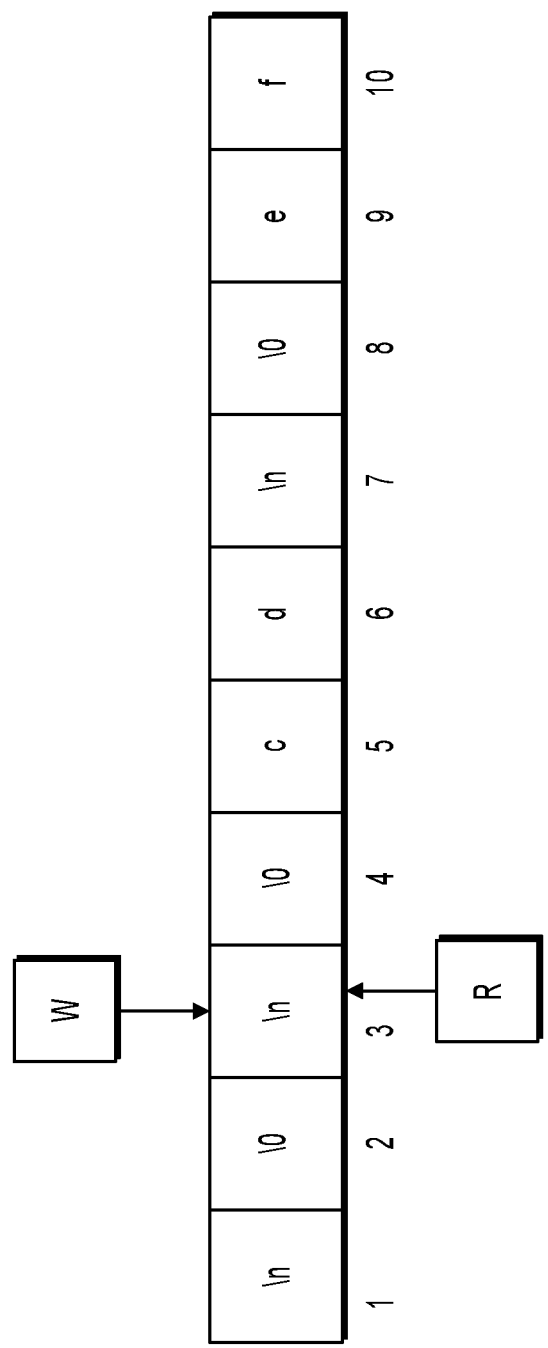

In FIG. 8, the shared memory has been read on the non-TEE side again. In one example, reading starts from the read offset address (address 9) until a previous address (address 2) of the write offset address. After the reading, the write offset address in the first address still points to address 3, and the read offset address in the second address also points to address 3.

In step S208, whether the number of bytes in the first data is less than or equal to the number of writable bytes is determined, where the number of writable bytes is determined based on the write offset address and the read offset address, and each address corresponds to one byte.

A person skilled in the art can determine a writable address in the multiple third addresses based on the write offset address and the read offset address. Because one address corresponds to one byte, the number of writable bytes can be determined.

For example, in the cases shown in FIG. 3, FIG. 6, and FIG. 8, if the read offset address and the write offset address point to the same address, the number of writable bytes is the number of all third addresses, that is, 10.

In the cases shown in FIG. 4 and FIG. 5, the write offset address is after the read offset address, the number of writable bytes is the number of third addresses minus the number of non-writable bytes, and the number of non-writable bytes is a difference between the write offset address and the read offset address. For example, in FIG. 4, the write offset address is 5, and the read offset address is 1. Therefore, the number of non-writable bytes is 5−1=4, and the number of writable bytes is 10−4=6, which respectively correspond to six addresses starting from address 5 to address 10.

In the case shown in FIG. 7, the write offset address is before the read offset address. In this case, the number of writable bytes is a difference between the read offset address and the write offset address. For example, in FIG. 7, the write offset address is 3, and the read offset address is 9. Therefore, the number of writable bytes is 9−3=6, which respectively corresponds to six addresses starting from address 3 to address 8.

In step S210, when the number of bytes in the first data is less than or equal to the number of writable bytes, the first data is written into third addresses starting from the write offset address.

For example, when data stored in the shared memory is shown in FIG. 4, as described above, the number of writable bytes is 6. When the first data to be written is 4 bytes "ef\n\0", because 4<6, the 4 bytes "ef\n\0" can be written to four addresses: address 5, address 6, address 7, and address 8.

When data stored in the shared memory is shown in FIG. 7, as described above, the number of writable bytes is 6.

Figure 9:
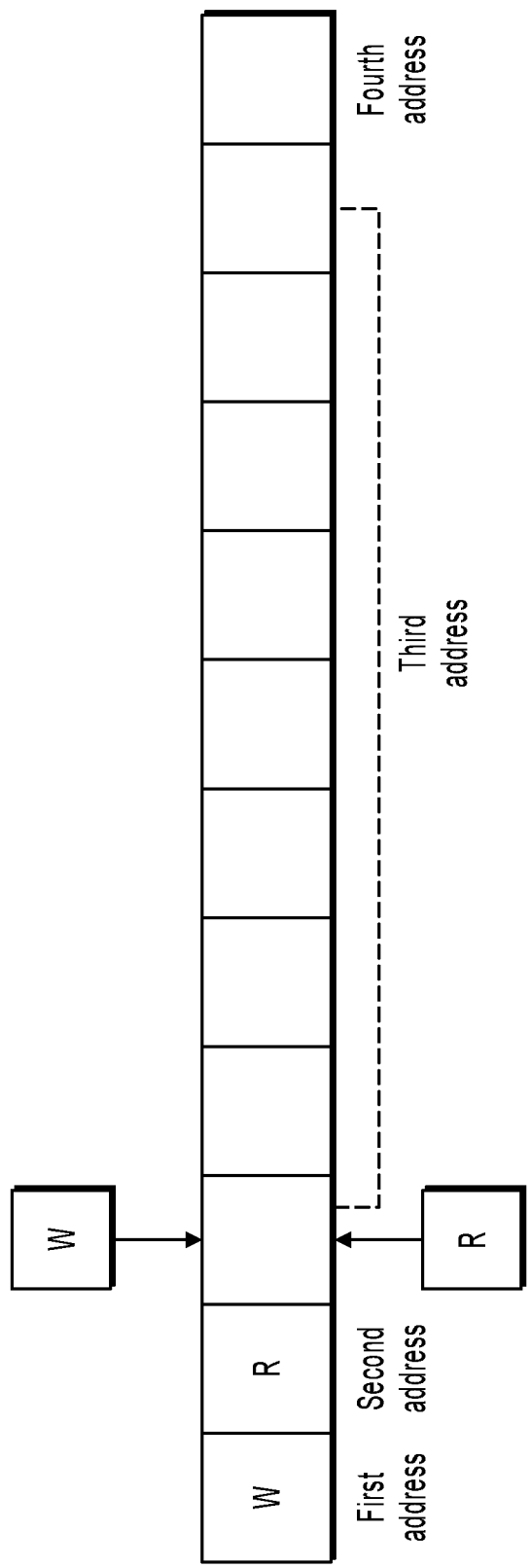
FIG. 9 shows a data structure of a shared memory, according to an embodiment of the present disclosure.

When the first data to be written is 8 bytes "ghijkl\n\0", that is, the number of bytes in the first data is greater than the number of writable bytes, the data may not be written into the shared memory. In this case, the write thread can wait until there are enough writable bytes in the shared memory, or can discard the first data and return. FIG. 9 shows a data structure of a shared memory, according to an embodiment of the present disclosure. In the data structure, in addition to the first address, the second address, and the third addresses described in FIG. 3, a fourth address is included, and the fourth address stores the quantity of discarded data. After the first data is discarded as described above, the quantity of discarded data is increased by 1 in the fourth address. In an embodiment, the quantity of discarded data is an atomic variable, so data security can be ensured when two threads operate simultaneously on the TEE side and the non-TEE side.

In step S212, the write offset address in the first address is updated.

For example, after "ab\n\0" is written to the third addresses in FIG. 3, the initial write offset address "1" is updated to the write offset address "5", thereby facilitating reading of the write offset address at a next write or read. For example, when the third addresses shown in FIG. 4 are written in, the latest write offset address "5" can be read to calculate the number of writable bytes.

Figure 10:
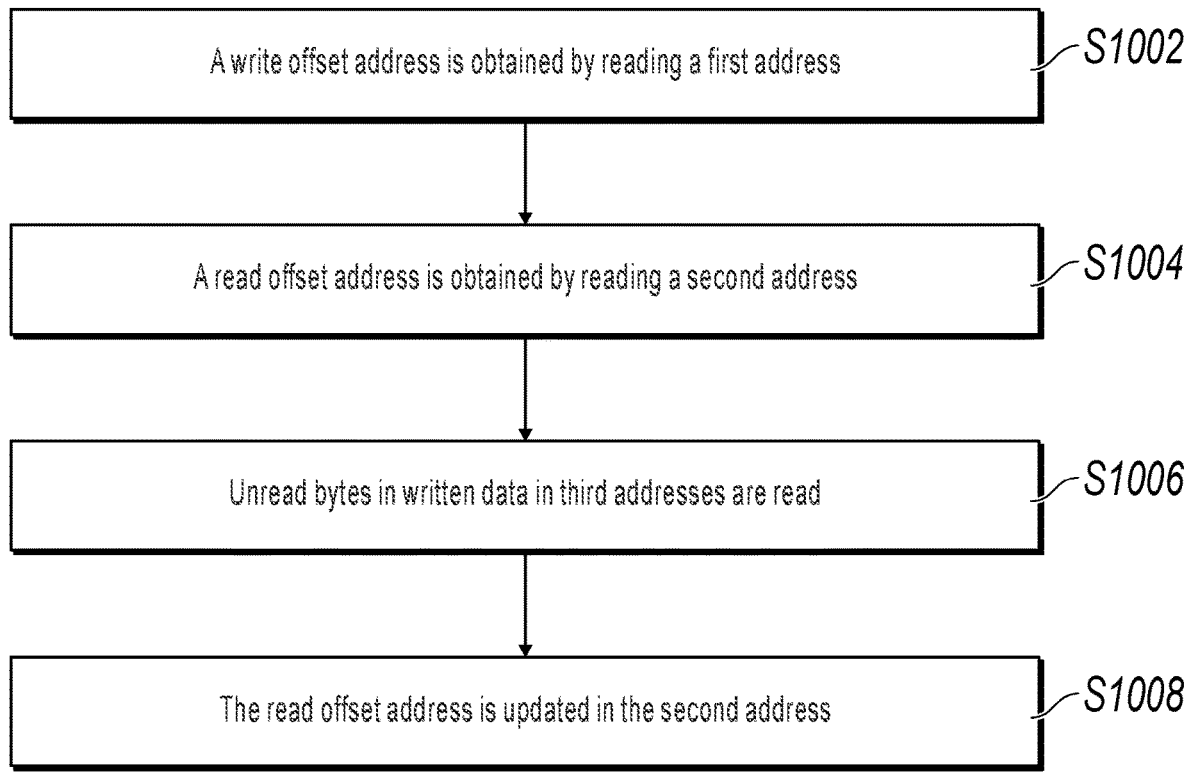
FIG. 10 is a flowchart illustrating a data transmission method in a TEE system, according to an embodiment of the present disclosure.

FIG. 10 is a flowchart illustrating a data transmission method in a TEE system, according to an embodiment of the present disclosure. The TEE system includes a TEE side and a non-TEE side. The noon-TEE side includes a shared memory on the non-TEE side, and the shared memory includes a first address, a second address, and multiple consecutive third addresses. The first address is used to store a write offset address, the write offset address indicates a writable start address in the multiple third addresses. The second address is used to store a read offset address, the read offset address indicates a readable start address in the multiple third addresses. The third addresses are used to store data from the TEE side. The method is executed by the non-TEE side and includes following steps.

At step S1002, a write offset address is obtained by reading the first address.

At step S1004, a read offset address is obtained by reading the second address.

At step S1006, unread bytes in written data in the third addresses are read as second data, where the unread bytes are determined based on the write offset address and the read offset address, and each address corresponds to one byte.

At step S1008, the read offset address is updated in the second address.

The method can be performed by a second thread running on the non-TEE side, and the second thread can also belong to the previous process used to transmit data from the TEE side to the non-TEE side.

For step S1002 and step S1004, refer to the previous description of step S204 and step S206. Details are omitted here.

In step S1006, unread bytes in written data in the third addresses are read as second data, where the unread bytes are determined based on the write offset address and the read offset address, and each address corresponds to one byte.

A person skilled in the art can determine an unread byte in the third addresses based on the write offset address and the read offset address.

For example, in the cases shown in FIG. 3, FIG. 6, and FIG. 8, the read offset address and the write offset address point to the same address, and the third addresses do not include the unread byte.

In the cases shown in FIG. 4 and FIG. 5, the write offset address is after the read offset address, all unread bytes in the third addresses include all bytes starting from the read offset address to a previous address of the write offset address. For example, in FIG. 4, the write offset address is 5 and the read offset address is 1. Therefore, all unread bytes are bytes in addresses 1 to 4.

In the case shown in FIG. 7, the write offset address is before the read offset address. In this case, all the unread bytes are bytes in the third addresses except read bytes, and the read bytes include all bytes starting from the write offset address to a previous address of the read offset address. For example, in FIG. 7, the write offset address is 3 and the read offset address is 9. Therefore, read bytes are bytes in addresses 3 to 8, and all unread bytes are bytes in addresses 1-2 and 9-10. It can be understood that in this step, not necessarily all unread bytes in the third addresses are read, but some unread bytes can be read. For example, it can be predetermined to read three bytes at a time, so the first three bytes of all unread bytes can be read in one read, and the remaining one unread byte can be read in a next read.

In step S1008, the read offset address in the second address is updated.

For example, after eight bytes "ab\n\0cd\n\0" are read from the third addresses shown in FIG. 5, the read offset address is updated from "1" to "9", thereby facilitating reading of the read offset address in a next write or read.

In an embodiment, the second data is log data, and the method further includes: after the read offset address in the second address is updated, sending the second data to a log printing program on the non-TEE side to print the second data. The printing includes, for example, displaying the data on a display or storing the data in a hard disk.

Figure 11:
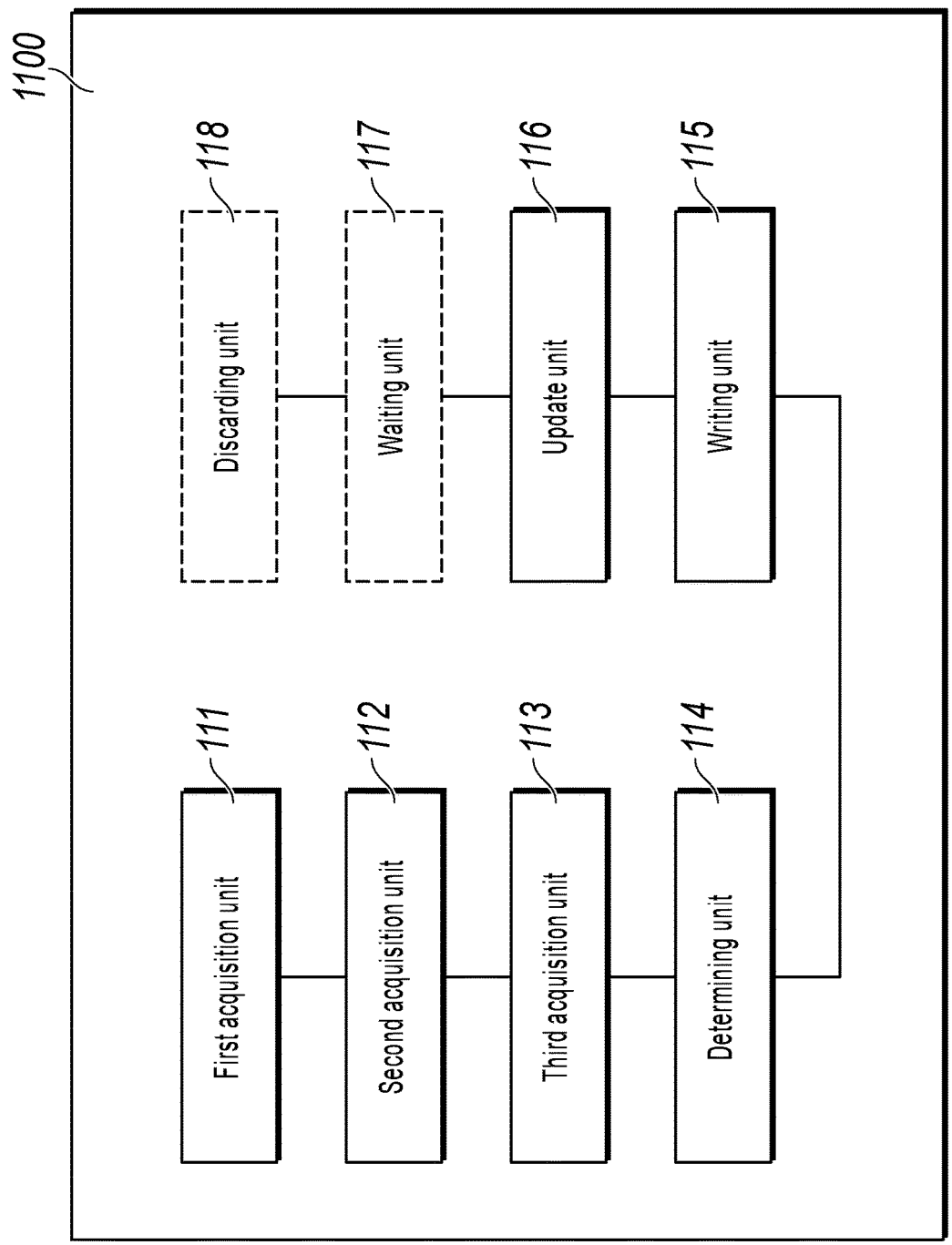
FIG. 11 shows a data transmission apparatus in a TEE system, according to an embodiment of the present disclosure.

FIG. 11 shows a data transmission apparatus 1100 in a TEE system, according to an embodiment of the present disclosure. The TEE system includes a TEE side and a non-TEE side. The non-TEE side includes a shared memory, and the shared memory includes a first address, a second address, and multiple consecutive third addresses. The first address is used to store a write offset address, the write offset address indicates a writable start address in the multiple third addresses. The second address is used to store a read offset address, the read offset address indicates a readable start address in the multiple third addresses. The third addresses are used to store data from the TEE side. The apparatus is deployed on the TEE side and includes: a first acquisition unit 111 configured to obtain first data; a second acquisition unit 112 configured to obtain a write offset address by reading the first address; a third acquisition unit 113 configured to obtain a read offset address by reading the second address; a determining unit 114 configured to determine whether the number of bytes in the first data is less than or equal to the number of writable bytes, where the number of writable bytes is determined based on the write offset address and the read offset address, and each address corresponds to one byte; a writing unit 115 configured to: when the number of bytes in the first data is less than or equal to the number of writable bytes, write the first data into third addresses starting from the write offset address; and an update unit 116 configured to update the write offset address in the first address.

In an embodiment, the apparatus further includes a waiting unit 117 configured to instruct the apparatus to wait when the number of bytes in the first data is greater than the number of writable bytes.

In an embodiment, the shared memory further includes a fourth address used to store the quantity of discarded data, and the apparatus further includes a discarding unit 118 configured to discard the first data when the number of bytes in the first data is greater than the number of writable bytes, and increase the quantity of discarded data stored in the fourth address by one.

Figure 12:
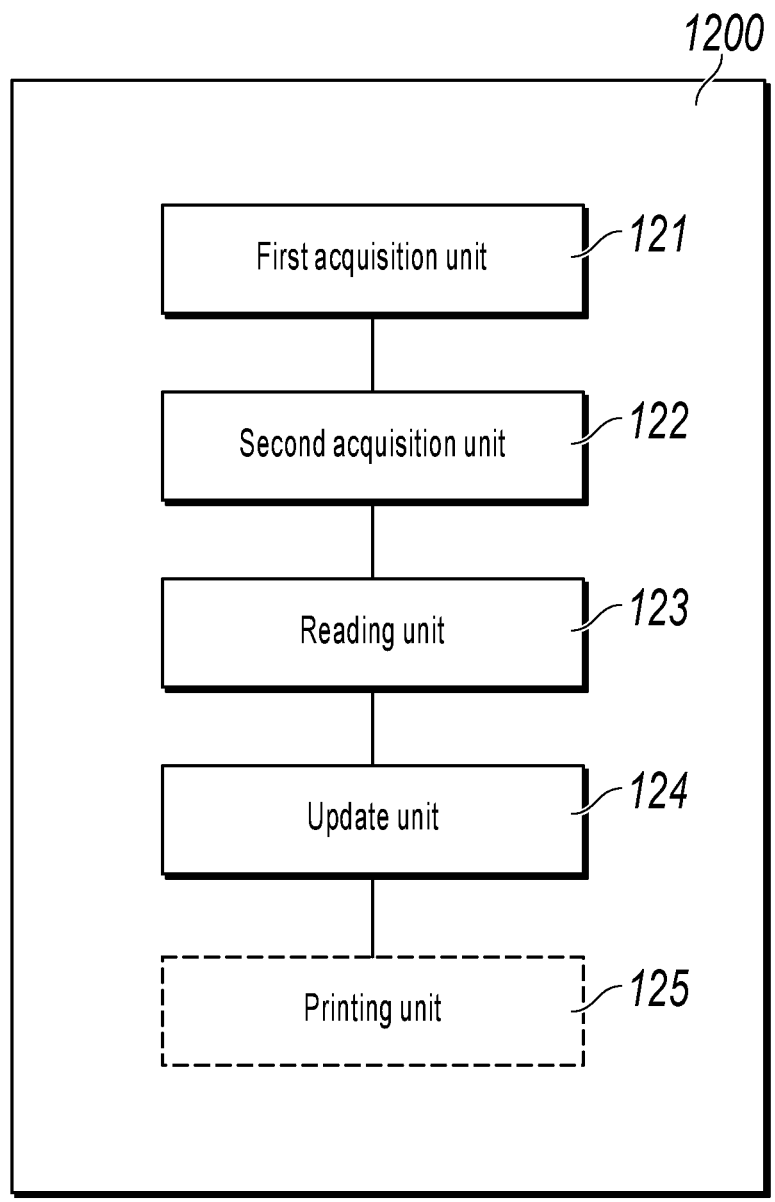
FIG. 12 shows a data transmission apparatus in a TEE system, according to an embodiment of the present disclosure.

FIG. 12 shows a data transmission apparatus 1200 in a TEE system, according to an embodiment of the present disclosure. The TEE system includes a TEE side and a non-TEE side. The non-TEE side includes a shared memory, and the shared memory includes a first address, a second address, and multiple consecutive third addresses. The first address is used to store a write offset address, the write offset address indicates a writable start address in the multiple third addresses. The second address is used to store a read offset address, the read offset address indicates a readable start address in the multiple third addresses. The third addresses are used to store data from the TEE side. The apparatus is deployed on the non-TEE side and includes: a first acquisition unit 121 configured to obtain a write offset address by reading the first address; a second acquisition unit 122 configured to obtain a read offset address by reading the second address; a reading unit 123 configured to read unread bytes in written data in the third addresses as second data, where the unread bytes are determined based on the write offset address and the read offset address, and each address corresponds to one byte; and an update unit 124 configured to update the read offset address in the second address.

In an embodiment, the second data is log data, and the apparatus further includes a printing unit 125 configured to: after the read offset address in the second address is updated, send the second data to a log printing program on the non-TEE side to print the second data.

Another aspect of the present disclosure provides a computer readable storage medium that stores a computer program, and when the computer program is executed on a computer, the computer is caused to perform the method according to any one of the previous aspects.

Another aspect of the present disclosure provides a computing device, including a memory and a processor. Executable code is stored in the memory, and when executing the executable code, the processor implements the method according to any one of the previous aspects.

In the embodiments of the present disclosure, because the shared memory is used at the same time by the TEE environment and the non-TEE environment, a lock may not be used to ensure thread security due to the particularity of the TEE. Therefore, in this solution, a lock-free data structure is used to ensure thread security by using a special design. In some embodiments, the shared memory includes the first address to the fourth address, where for the first address and the second address, one side is written, and the other side is read only. Therefore, there is no problem of simultaneously writing. In addition, when one side is read and the other side is written, because a write offset address is updated when writing is completed, and a read offset address is updated when reading is completed, there is no case where data is not processed but the offset address is updated. Therefore, unwritten data will not be read and unread data will not be overwritten by written data. Data stored in the third addresses is read/written on both sides, and a read/write range is controlled by using a write offset address and a read offset address. Therefore, the read and write ranges are separated and do not interfere with each other. In addition, although the quantity of discarded data in the fourth address is also read and written at the same time, data security is ensured by setting the quantity of discarded data as an atomic variable.

The previous design of the lock-free data structure provides a high-performance asynchronous data transmission system for the TEE environment, for example, an asynchronous log printing system, which reduces overheads of printing logs in the TEE system, improves a running speed of the TEE system, and meets some basic requirements for the log system.

It should be understood that descriptions such as "first" and "second" in the present disclosure are merely intended to distinguish between similar concepts for simplicity of description, and do not impose a limitation.

The embodiments in the present disclosure are described in a progressive way. For same or similar parts of the embodiments, references can be made to the embodiments. Each embodiment focuses on a difference from other embodiments. Particularly, a system embodiment is similar to a method embodiment, and therefore is described briefly. For related parts, references can be made to related descriptions in the method embodiment.

Some embodiments of the present disclosure are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some embodiments, multi-tasking and concurrent processing is feasible or can be advantageous.

A person of ordinary skill in the art can be further aware that, in combination with the examples described in the embodiments disclosed in the present disclosure, units and algorithm steps can be implemented by electronic hardware, computer software, or a combination thereof. To clearly describe interchangeability between the hardware and the software, compositions and steps of each example are generally described above based on functions. Whether the functions are performed by hardware or software depends on particular applications and design constraint conditions of the technical solutions. A person of ordinary skill in the art can use different methods to implement the described functions for each particular application, but it should not be considered that the embodiment goes beyond the scope of the present application.

Steps of methods or algorithms described in the embodiments disclosed in the present disclosure can be implemented by hardware, a software module executed by a processor, or a combination thereof. The software module can reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the described embodiments, the objective, technical solutions, and benefits of the present disclosure are further described in detail. It should be understood that the descriptions are some embodiments of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A computer-implemented method for exchanging data between devices in a trusted execution environment (TEE) system, comprising:
    obtaining data by a device on a TEE side of the TEE system, wherein the TEE system also comprises a non-TEE device that includes a shared memory, the shared memory comprising a first address, a second address, and multiple consecutive third addresses that store data from the TEE side;
    obtaining a write offset address by reading the first address, the write offset address indicating a writable start address in the multiple consecutive third addresses;
    obtaining a read offset address by reading the second address, the read offset address indicating a readable start address in the multiple consecutive third addresses;
    determining whether a number of bytes in the data is less than or equal to a number of writable bytes, wherein the number of writable bytes is determined based on the write offset address and the read offset address, and wherein each address corresponds to one byte;
    in response to determining that the number of bytes in the data is less than or equal to the number of writable bytes, writing the data into at least a portion of the multiple consecutive third addresses starting from the write offset address; and
    updating the write offset address in the first address.

2. The computer-implemented method of claim 1, further comprising:
    in response to determining that the number of bytes in the data is greater than the number of writable bytes, waiting until the number of bytes in the data is less than or equal to the number of writable bytes.

3. The computer-implemented method of claim 1, wherein the shared memory further comprises a fourth address that stores a quantity of discarded data, and wherein the method further comprises:
    in response to determining that the number of bytes in the data is greater than the number of writable bytes, discarding the data; and
    increasing the quantity of discarded data stored in the fourth address by one.

4. The computer-implemented method of claim 3, wherein the quantity of discarded data is an atomic variable.

5. The computer-implemented method of claim 1, wherein the write offset address is before the read offset address in the shared memory, and wherein the number of writable bytes is equal to a difference between the read offset address and the write offset address.

6. The computer-implemented method of claim 1, wherein the write offset address is after the read offset address in the shared memory, wherein the number of writable bytes is equal to a difference between a number of the multiple consecutive third addresses and a number of non-writable bytes, and wherein the number of non-writable bytes is equal to a difference between the write offset address and the read offset address.

7. The computer-implemented method of claim 1, wherein the write offset address is the same as the read offset address, and wherein the number of writable bytes is equal to a number of the multiple consecutive third addresses.

8. A non-transitory, computer-readable medium storing one or more instructions that, when executed by a computer system, cause the computer system to perform operations for exchanging data between devices in a trusted execution environment (TEE) system, wherein the operations comprise:
  obtaining data by a device on a TEE side of the TEE system, wherein the TEE system also comprises a non-TEE device that includes a shared memory, the shared memory comprising a first address, a second address, and multiple consecutive third addresses that store data from the TEE side;
  obtaining a write offset address by reading the first address, the write offset address indicating a writable start address in the multiple consecutive third addresses;
  obtaining a read offset address by reading the second address, the read offset address indicating a readable start address in the multiple consecutive third addresses;
  determining whether a number of bytes in the data is less than or equal to a number of writable bytes, wherein the number of writable bytes is determined based on the write offset address and the read offset address, and wherein each address corresponds to one byte;
  in response to determining that the number of bytes in the data is less than or equal to the number of writable bytes, writing the data into at least a portion of the multiple consecutive third addresses starting from the write offset address; and
  updating the write offset address in the first address.

9. The non-transitory, computer-readable medium of claim 8, wherein the operations further comprise:
  in response to determining that the number of bytes in the data is greater than the number of writable bytes, waiting until the number of bytes in the data is less than or equal to the number of writable bytes.

10. The non-transitory, computer-readable medium of claim 8, wherein the shared memory further comprises a fourth address that stores a quantity of discarded data, and wherein the operations further comprise:
  in response to determining that the number of bytes in the data is greater than the number of writable bytes, discarding the data; and
  increasing the quantity of discarded data stored in the fourth address by one.

11. The non-transitory, computer-readable medium of claim 10, wherein the quantity of discarded data is an atomic variable.

12. The non-transitory, computer-readable medium of claim 8, wherein the write offset address is before the read offset address in the shared memory, and wherein the number of writable bytes is equal to a difference between the read offset address and the write offset address.

13. The non-transitory, computer-readable medium of claim 8, wherein the write offset address is after the read offset address in the shared memory, wherein the number of writable bytes is equal to a difference between a number of the multiple consecutive third addresses and a number of non-writable bytes, and wherein the number of non-writable bytes is equal to a difference between the write offset address and the read offset address.

14. The non-transitory, computer-readable medium of claim 8, wherein the write offset address is the same as the read offset address, and wherein the number of writable bytes is equal to a number of the multiple consecutive third addresses.

15. A computer-implemented system, comprising:
  one or more computers; and
  one or more computer memory devices interoperably coupled with the one or more computers and having tangible, non-transitory, machine-readable media storing one or more instructions that, when executed by the one or more computers, cause the one or more computers to perform one or more operations for exchanging data between devices in a trusted execution environment (TEE) system, wherein the operations comprise:
    obtaining data by a device on a TEE side of the TEE system, wherein the TEE system also comprises a non-TEE device that includes a shared memory, the shared memory comprising a first address, a second address, and multiple consecutive third addresses that store data from the TEE side;
    obtaining a write offset address by reading the first address, the write offset address indicating a writable start address in the multiple consecutive third addresses;
    obtaining a read offset address by reading the second address, the read offset address indicating a readable start address in the multiple consecutive third addresses;
    determining whether a number of bytes in the data is less than or equal to a number of writable bytes, wherein the number of writable bytes is determined based on the write offset address and the read offset address, and wherein each address corresponds to one byte;
    in response to determining that the number of bytes in the data is less than or equal to the number of writable bytes, writing the data into at least a portion of the multiple consecutive third addresses starting from the write offset address; and
    updating the write offset address in the first address.

16. The computer-implemented system of claim 15, wherein the operations further comprise:
  in response to determining that the number of bytes in the data is greater than the number of writable bytes, waiting until the number of bytes in the data is less than or equal to the number of writable bytes.

17. The computer-implemented system of claim 15, wherein the shared memory further comprises a fourth address that stores a quantity of discarded data, and wherein the operations further comprise:
  in response to determining that the number of bytes in the data is greater than the number of writable bytes, discarding the data; and
  increasing the quantity of discarded data stored in the fourth address by one.

18. The computer-implemented system of claim 17, wherein the quantity of discarded data is an atomic variable.

19. The computer-implemented system of claim 15, wherein the write offset address is before the read offset address in the shared memory, and wherein the number of writable bytes is equal to a difference between the read offset address and the write offset address.

20. The computer-implemented system of claim 15, wherein the write offset address is after the read offset address in the shared memory, wherein the number of writable bytes is equal to a difference between a number of the multiple consecutive third addresses and a number of non-writable bytes, and wherein the number of non-writable bytes is equal to a difference between the write offset address and the read offset address.

21. The computer-implemented system of claim 15, wherein the write offset address is the same as the read offset address, and wherein the number of writable bytes is equal to a number of the multiple consecutive third addresses.

\* \* \* \* \*